1941. O. F. QUARTULLO 2,233,181
AUTOMOBILE BODY
Filed April 13, 1939   6 Sheets-Sheet 1
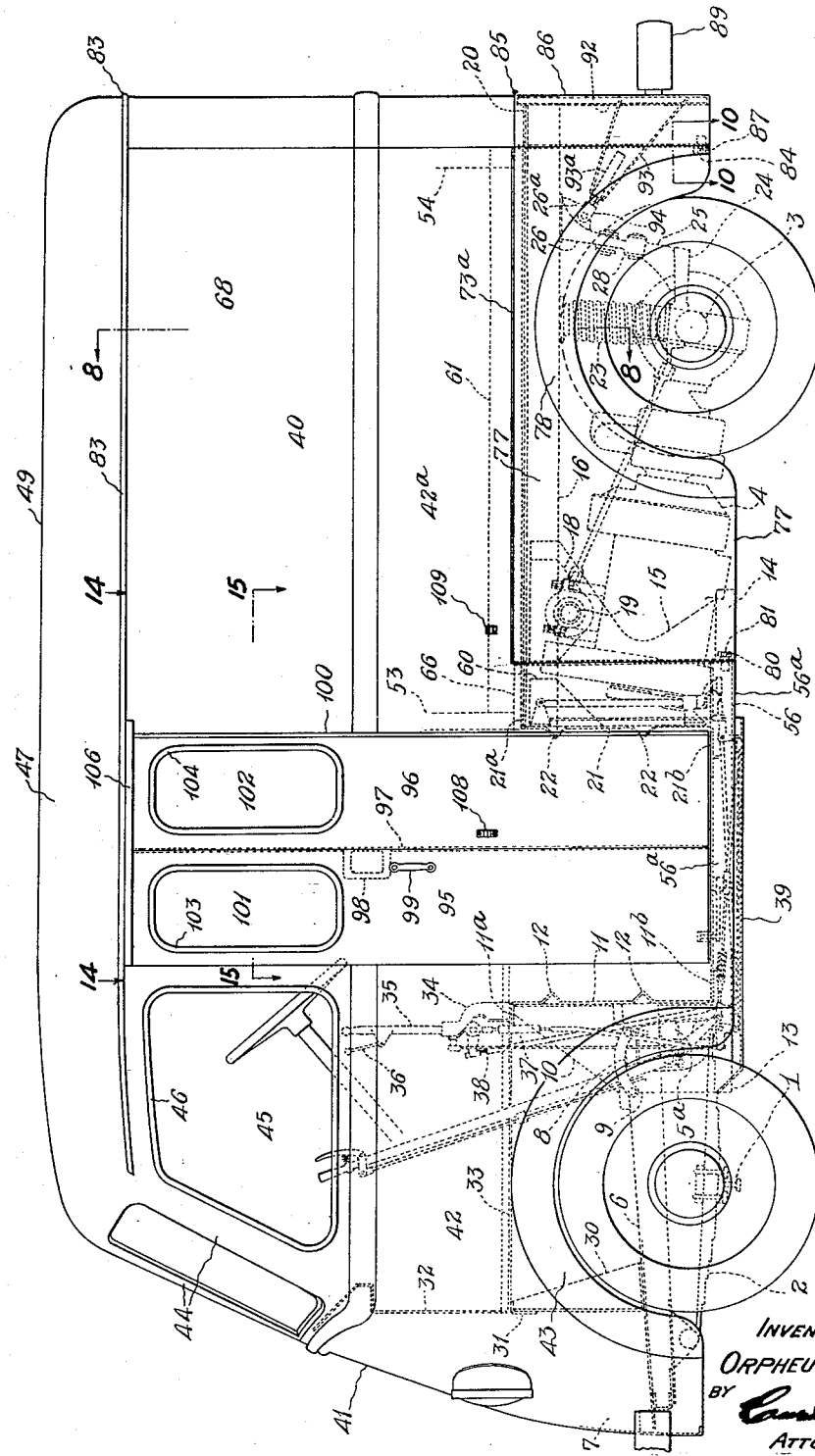
FIG. 1.
INVENTOR:
ORPHEUS F. QUARTULLO
BY
ATTORNEY

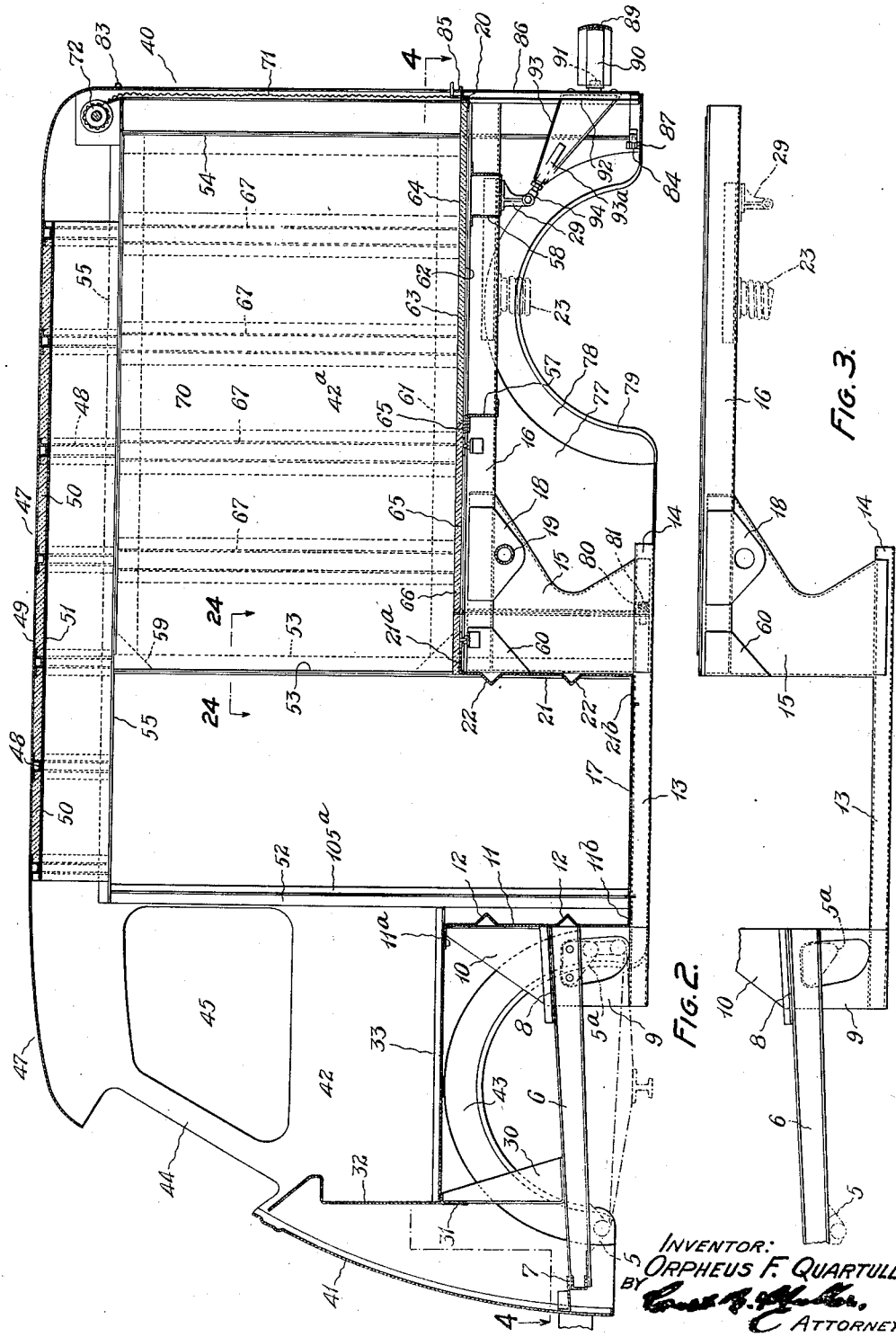

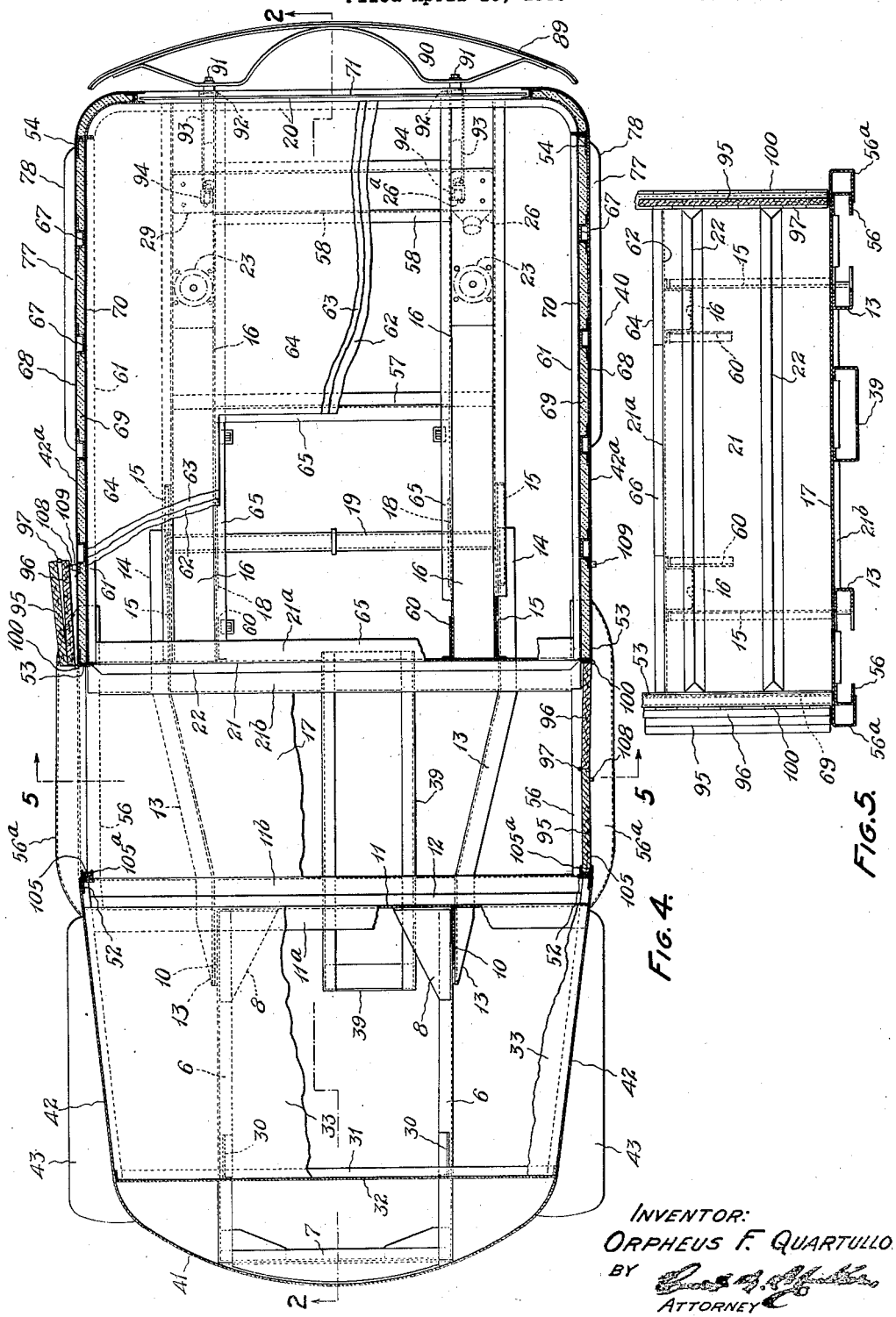

INVENTOR:
ORPHEUS F. QUARTULLO
BY
ATTORNEY

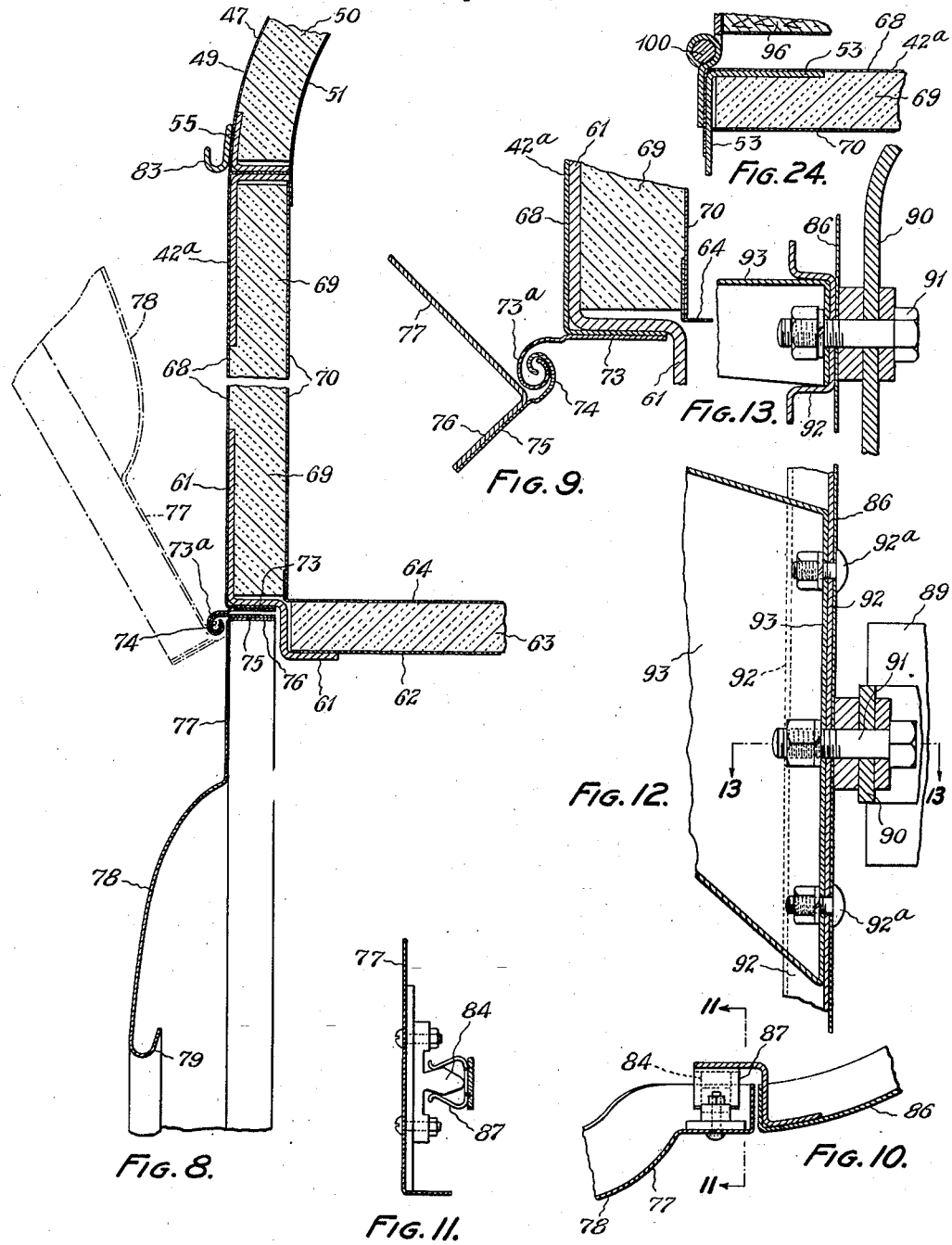

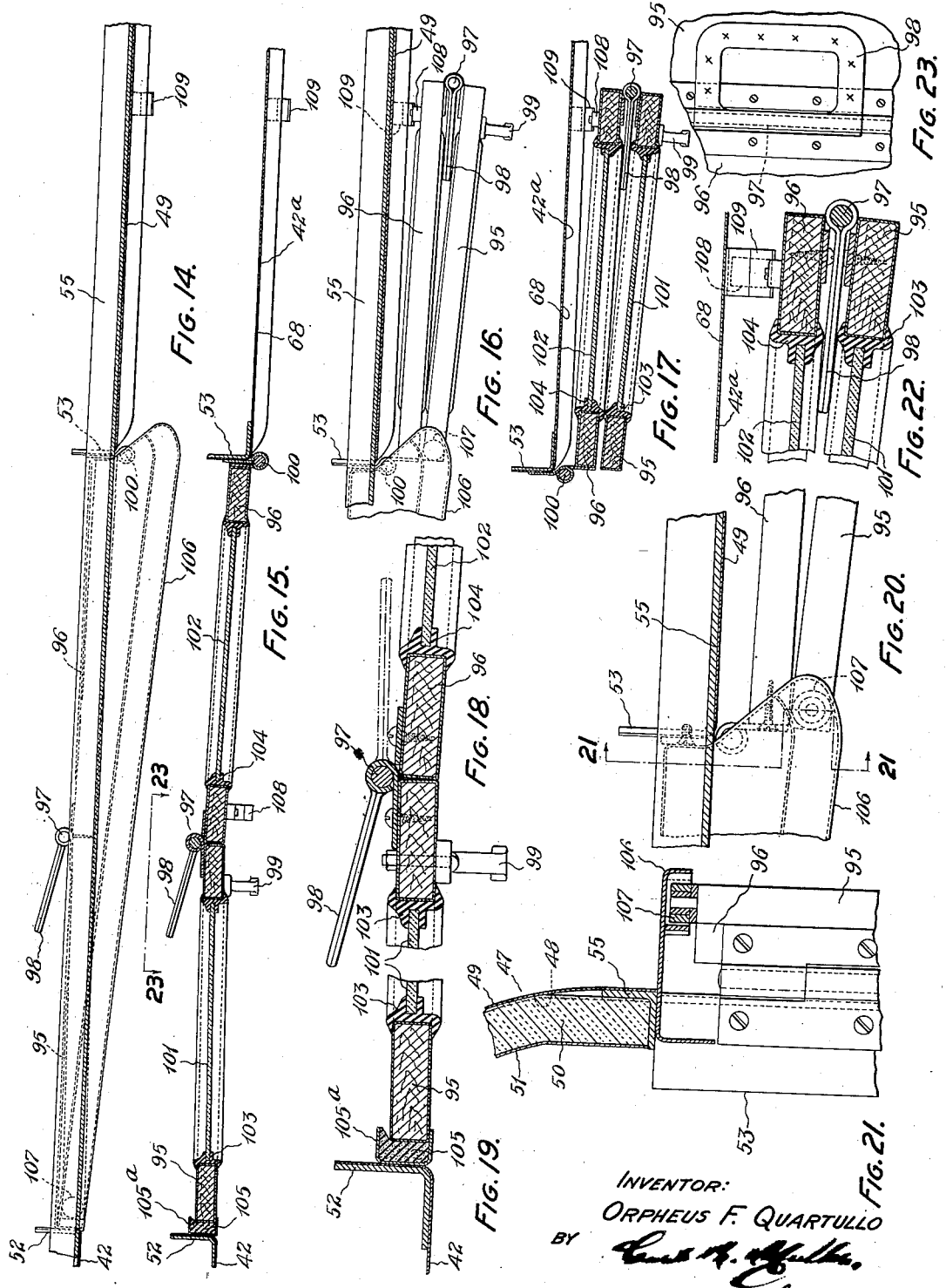

Patented Feb. 25, 1941

2,233,181

UNITED STATES PATENT OFFICE 2,233,181

AUTOMOBILE BODY

Orpheus F. Quartullo, Cleveland Heights, Ohio, assignor to The White Motor Company, Cleveland, Ohio Application April 13, 1939, Serial No. 267,538

5 Claims. (Cl. 296—25)

My invention pertains to a vehicle body and more particularly, as exemplified by the drawings, to the body construction of what has come to be known as the multi-delivery type of automobile which comprises a forward cross passage having a low floor to permit the operater to stand therein.

One object has been to adapt the body design so as to facilitate access to an engine assembly and to facilitate removal of such an assembly as a tractor unit from underneath the surmounted body. This I accomplish by a plurality of hinged aprons adapted for interlocking connections in pairs.

A further object has been the provision of an improved mounting for a bumper on at least one of the hinged aprons and the provision of readily disconnectable means associated with the bumper mounting adapted to transmit the bumper thrusts to the supporting frame of the body without injury to the apron or its hinge.

Another object has been the provision of an improved type of hinge on the aprons making possible the endwise disconnection of the aprons from the body when the former are lifted.

Another object has been the provision of reinforcement of the structure of the cross passage which in conjunction with a unitary top forms a truss at the cross passage. Such a reinforcement comprises oblique passage-floor elements adapted to function as lateral braces and further comprises appropriate laterally extending ribs or corrugations in vertically disposed and crosswise extending panels forwardly and rearwardly of the passage.

Another object has been the provision of an improved type of connection between the floor beams under the cross passage and the approximately alined longitudinally extending beams supported on the axle structures whereby strong offset beam structures are produced extending from front to rear of the body.

Another object has been the provision for concealment of insulation incorporated in the body walls between strengthening ribs or corrugations thereof and also in the platform which supports the merchandise carried in the body.

A further object has been the provision of a relatively very large removable panel in the merchandise carrying platform of the body providing for inspection and access to the engine and substantially the entire upper portion of the power transmission unit.

A further object has been the provision of previously employed folding doors, but so mounted as to pass dead center position when in their closed positions whereby yieldingly to remain so.

Still another object has been to provide the door panels with rubber strips so located as to prevent noise when the doors are in an open position.

Another object has been the provision of an operating handle which is carried by one of the hinges suitably located to provide an effective control of the doors from the inside of the body.

Another object has been to provide appropriate cooperating yielding retaining catches between the body aprons and body and between the folded door and body.

A further object has been to provide a rear roll door with the advantage that the vehicle may be directly backed against a loading platform and yet permit its rear door to be opened and incidentally without any lateral door projection which, aside of the hazard of injury thereto, lessens the number of trucks which as a row may simultaneously load or unload at a platform of a certain length and which furthermore avoids the necessity of stopping the trucks a certain distance from the platform, then opening the doors and thereafter again backing the truck close to the platform.

Adverting to the drawings:

Fig. 1 is a side elevation of the complete vehicle embodying my improved body construction and with certain concealed parts shown in dotted lines.

Fig. 2 is a longitudinal section through the body detached from the axles and engine and likewise showing a few parts in dotted lines, this view being taken on the zig-zag lines 2—2 of Fig. 4.

Fig. 3 is a side elevation of one of the longitudinal channel beam units which effect connection between the axles and the super-structure of the body.

Fig. 4 is a plan section through the body viewed on zig-zag lines 4—4 of Fig. 2 with certain portions partly broken away below the plan of said section lines.

Fig. 5 is a fragmentary vertical cross section on line 5—5 of Fig. 4 looking rearwardly.

Fig. 8 is an enlarged vertical section through one side of the body taken on line 8—8 of Fig. 1 and with one of the side aprons shown by dot and dash lines in its elevated position.

Fig. 9 is a still further enlarged fragmentary view of the hinge portion of Fig. 8 and showing the apron in its raised position.

Fig. 10 is an enlarged horizontal section on line 10—10 of Fig. 1 showing one of the interlocked connections at the bottom of a side apron and the rear apron.

Fig. 11 is a section on line 11—11 of Fig. 10.

Fig. 12 is an enlarged vertical section through the connection between a bumper bracket and the rear apron.

Fig. 13 is a plan-sectional view on line 13—13 of Fig. 12.

Fig. 14 is an enlarged plan-sectional view on line 14—14 of Fig. 1 looking downwardly.

Fig. 15 is a correspondingly enlarged plan-sectional view on line 15—15 of Fig. 1 through the two door windows and above the oppositely disposed door handles.

Fig. 16 is a similarly enlarged fragmentary view corresponding to Fig. 14, but with the door folded to its open position.

Fig. 17 is a fragmentary sectional view corresponding to Fig. 15, but with the door folded to its fully open position.

Fig. 18 is a further enlarged view of the hinge structure between the two panels of the folding door.

Fig. 19 is a correspondingly enlarged view of the jamb portion of Fig. 15.

Fig. 20 is a similarly enlarged view of a portion of Fig. 16.

Fig. 21 is a section on line 21—21 of Fig. 20.

Fig. 22 is a view of a portion of Fig. 17, though on a larger scale.

Fig. 23 is an elevation of the hinge and inside door handle taken on line 23—23 of Fig. 15 though on more enlarged scale.

Fig. 24 is an enlarged plan section on line 24—24 of Fig. 2.

Figure 6:
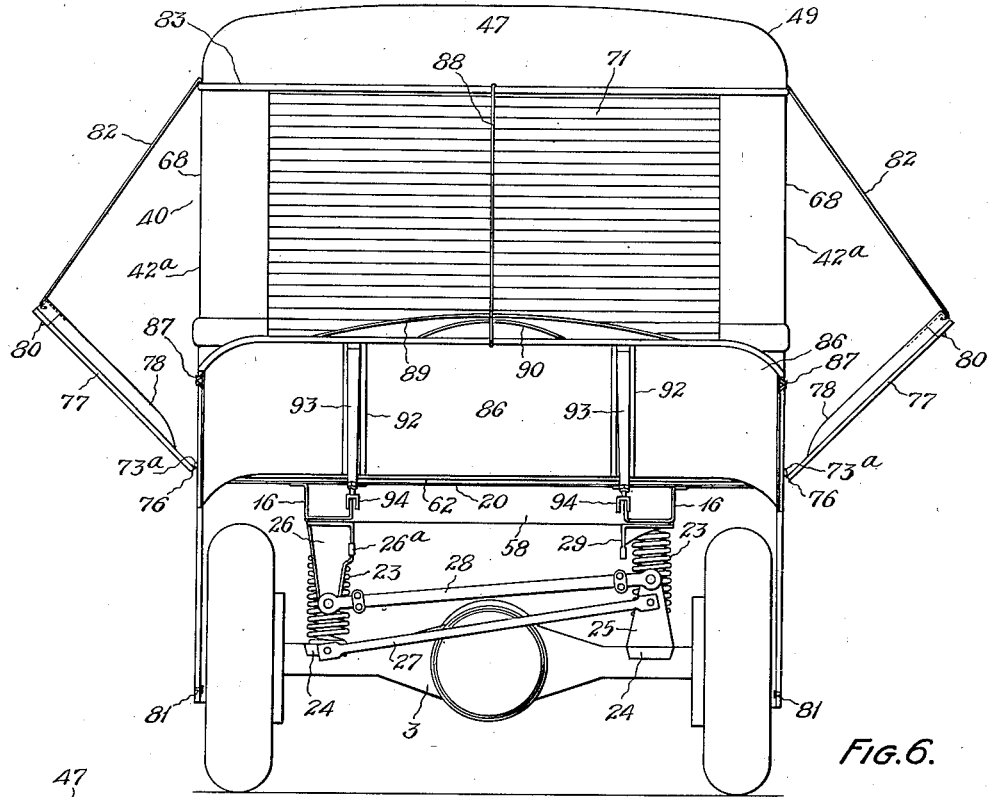
Fig. 6 is a rear elevation of the automotive vehicle shown in Fig. 1 and illustrating a rear and two side aprons displaced to an elevated position.

The automotive vehicle with which this improved body construction is used includes a wheeled front axle structure 1 comprising leaf springs 2 and a wheeled rear driving axle structure 3 including in firm connection therewith, an engine and power transmission assembly 4. The type of engine and transmission, and the improved manner in which it is mounted is shown, described and claimed in my co-pending application filed March 3, 1939, Serial Number 259,517 and therefore no detailed description thereof is here required.

It is to be understood that the commercial delivery type of vehicle body, which constitutes the subject matter claimed in this application, strictly speaking, lacks a conventional chassis on which a super-structure is to be mounted, because the entire body construction is an integral, mostly welded assembly for attachment to the two axle structures. Two lateral built-up supporting channel beam units, of which one is shown in Fig. 3, span the distance between the two axle structures and since they are duplicates only one will be described and the singular number mainly employed. The channel beam shown in Fig. 3 is of the form including an offset portion having a section of the cantilever type attached at its front at 5 to the front end of the leaf spring 2 to extend in a somewhat upwardly inclined rearward direction at 6 and attached at its rear at 5a to a link associated with the rear end of the leaf spring and connected with an upright web plate including a lower section 9 and an upper section 10. Extending across the vehicle from one web plate 9—10 to the other on the opposite side of the vehicle and extending beyond the web plates 9—10, is plate 11 fashioned with a pair of integrally formed horizontally extending stiffening ribs or corrugations 12, and formed at its upper edge with a forwardly extending flange 11a and at its lower edge with a rearwardly directed flange 11b, all as clearly shown in Figs. 2 and 3. Gusset plates 8 are provided to firmly connect the rear ends of the beam portions 6 to the web plates 9—10 and to the transverse plate 11. The front ends of the beam portions 6 are firmly connected together by means of a transverse channel, plate 7 and gussets indicated at 7. Diverging rearwardly from the bottoms of the web sections 9 are a pair of continuing beam sections 13 which constitute the low floor supports of a cross passage through the vehicle. A long anchorage for the rear end of each beam 13 is supplied by having parallel rear sections 14 of the beam 13 extended well beyond the rear of the cross passage while upward connection of the rear end 14 is made through a web plate 15 with an elevated rearwardly extending channel beam 16 intended to support the rear loading floor. A floor plate 17 is secured to the oblique beam sections 13 and extends laterally beyond the outer sides of such sections.

A bracket 18 is secured to each channel 16 somewhat rearwardly of the cross passage and laterally alined with the upper rear portions of the web plates 15 and suitably mounted in the two brackets 18 and in the web plates 15 is a tube 19 the middle of which supports the front of the engine 4 as explained in my earlier identified co-pending application. Extending crosswise between the upper corners of the rear ends of the channel beams 16 is a transverse tie bar 20. Along the rear side of the cross passage above the floor 17 and adjacent to the front ends of the beams 16 is another crosswise extending plate 21 fashioned with a pair of integrally formed horizontally extending corrugations or reinforcing ridges 22. This crosswise extending plate 21 is further formed at its upper edge with a rearwardly extending flange 21a fixedly secured to the beams 16 and the plate 21 is further formed at its lower edge with a forwardly directed flange 21b secured to the upper flanges of the beams 13. Coil springs 23 effect connection between each of the beams 16 and the rear axle structure 3 in a manner likewise fully described in the co-pending application to which I have herein referred, where the extensions 24 from the rear axle, the upstanding bracket 26 from the beam 16 over the opposite end of the axle, the bracket rod 27 and radius rod 28 likewise have their equivalents disclosed. In this present construction the bracket 26 is additionally formed with an apertured boss 26a and the opposite channel beam 16 is additionally provided near its rear end with a depending apertured bracket 29 shown in Figs. 2, 3 and 6 and the purpose of which will be later explained.

Rising from an interjacent part of each of the forward beam sections 6 is an angle bracket plate 30 across which is secured an angle bar 31, best shown in Fig. 4. Extending upwardly from each of the angles 31 is a wall plate 32 and extending rearwardly from the latter is a plate 33 to serve as a front merchandise shelf and the rear end of the plate 33 may be welded or otherwise joined to the flange 11a, at the upper edge of the plate 11. Projecting above the rear of the plate 33 at one side of the vehicle and secured to the plate 11, as appears in dotted lines in Fig. 1, is a dual control mechanism including a standard 34, a lever 35 and a lever-carried latch 36. The lever 35 and latch 36 operate connections 37 and 38 which lead to the engine assembly and sections of which pass underneath the floor 17 through a shallow, hollow splash-proof sled-like pan 39 with inwardly directed upper flanges secured to the lower side of the flanges 11b and 21b of floor 17, as most clearly shown in Fig. 5. The upstanding lever 35 will have the standard gear shift movements and the latch 36 when pulled toward the lever 35 by the fingers of the operator's hand will effect fluid-pressure release of the clutch, but further description is here unnecessary because such dual forward control mechanism of a power unit carried at the rear of the vehicle will be fully shown, described and claimed in an application now under preparation and later to be identified by its future filing date and serial number.

The super-structure of the composite body, designated in its entirety in Fig. 1 with the numeral 40, comprises a front panel 41, front lateral panels 42, rear lateral panels 42a, front wheel fenders 43, windshield frame 44, side windows 45, mounted in continuous rubber bead frames 46, and a top 47. The latter is constructed of a row of arched stiffening members 48 of channel design which are exteriorly covered by a sheet metal roof 49 welded thereto. Snugly fitted between each adjacent pair of the stiffening members of ribs 48 are insulating strips 50 the inner sides of which are substantially flush with the inner flat surfaces of the ribs and are then interiorly covered with a sheet or sheets of metal 51 as clearly appears in Figs. 2, 4 and 8.

Extending between the front panels 42 and rear panels 42a and connected to these panels are channel beams 56 as best shown in Figures 4 and 5, the upper flanges of these channels 56 being alined with the upper surfaces of the channel sections 13, and thereby serving as lateral supports for the floor 17 in addition to cooperating with the panels 42, 42a and the roof 47 to produce a structurally strong side wall for the body. As best shown in Figures 4 and 5, channel shaped members 56a are mounted on the lateral channels 56, the tops of these members forming extensions for the floor plate 17 and the outer walls projecting beyond the sides of the body, serving the purpose of side bumpers.

Rising from opposite sides of the front of the floor of the cross-passage are uprights 52 of angular cross sectional shape as shown, for instance, in Figs. 4 and 14. Similarly rising from opposite ends of the rear of the floor are uprights 53 of L-shaped cross section as shown, for instance, in Figs. 4 and 24. Corresponding roof-supporting uprights 54 are also provided at the rear corners of the body as shown in Figs. 2 and 4. Extending longitudinally across the tops of the roof supporting uprights 52, 53 and 54 and connected thereto are angle iron connectors or stringers 55 as shown, for instance, in Figs. 2 and 21. It will be understood that the lateral floor beams 56 are likewise welded to the uprights 52 and 53. Crosswise stiffeners 57 and 58, shown in Figs. 2 and 4, extend between the channel beams 16. Gusset plates 59 tie together the corners between the members 53 and 55. Gusset plates 60 are also provided to tie together the crosswise plates 21 and those vertical walls of the beams 16 which are not attached to the web plates 15.

The lower edges of the sides of the body which enclose the elevated rear storage compartment are reinforced by zig-zag elements 61 shown in Fig. 8. Carried by the lower flanges of the elements 61 as well as by the beams 16 and stiffeners 57 and 58 is a composite insulated floor comprising a lower sheet 62, insulation 63 and an upper sheet 64 as clearly appears in Fig. 8. So much of the rear flooring as is composed of the elements 62, 63 and 64 is roughly of C-shape because of the provision of a cut-out area over the front of the engine, as appears in Fig. 4. At the four sides of such cut-out area ledges 65 are formed comprising the flange 21a and flanges of the members 16 and 57, to serve as rests for an insulated trap door 66. The latter appears in position in Fig. 2 but is absent in Fig. 4. The purpose of the trap door is to facilitate attachment or detachment of the front of the engine around the tube 19 or for any other engine examination or attention. As in the case of the top, the panels 42a between the cross passage and the rear of the vehicle comprise a plurality of upright stiffeners 67, outer sheet 68, interfitted insulation 69 and interior sheets 70. A rear flexible roll door 71, of any standard design comprising articulated strips, is adapted to wind on or unwind from a roll 72 appropriately mounted in the upper rear of the top as shown in Fig. 2. The door 71 may be conveniently pulled down by grasping its handles, against the action of a conventional counter-weighting spring until its lower edge meets the tie bar 20 to which it may be optionally locked in a manner not shown.

To an interjacent horizontal surface of the reinforcing element 61, as shown in Figs. 8 and 9, is secured on each side of the vehicle one unit 73 of a hinge construction for displaceably supporting a side apron. The unit 73 extends outwardly to form, as viewed in cross section in Fig. 9, a spiral terminus 73a. Interfitted with the terminus 73a, which extends longitudinally of the vehicle from about the middle of the web plate 15 to the rear end of the side panel of the vehicle, is a similar open spiral construction 74 which extends from a flat section 75 which is welded to a flange 76 formed on a side apron 77. This type of hinge connection 73a—74 has the advantage of permitting relative axial movement to permit the apron to be slid out rearwardly and laid aside when it is desired to have convenient access to and part of the rear axle assembly for longer periods of time or for extensive repairs or renewals.

Figure 7:
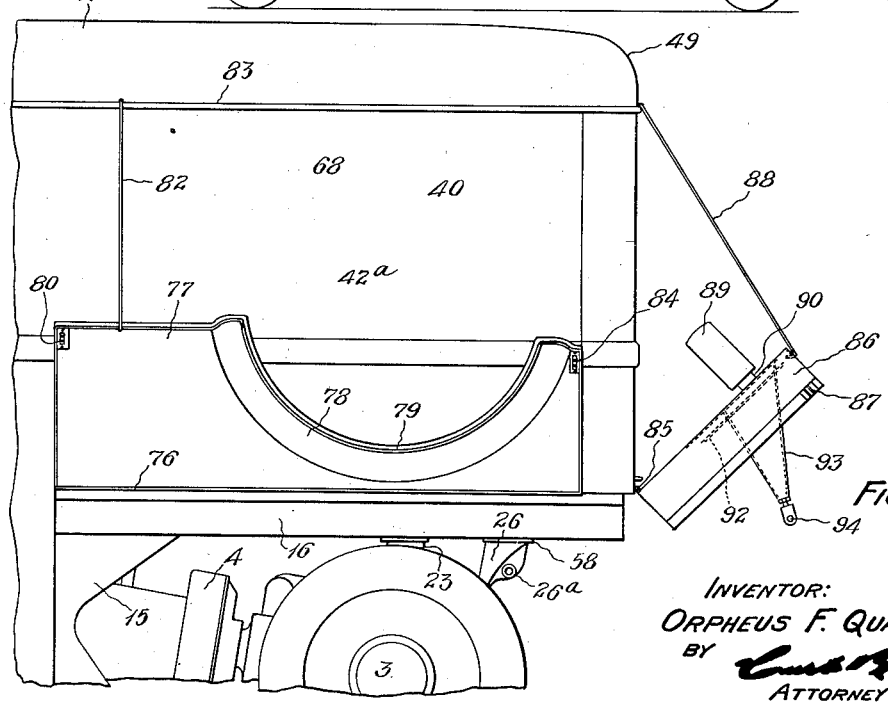
Fig. 7 is a fragmentary side elevation of the rear end of the vehicle with the three aprons swung up and held as shown in Fig. 6.

The apron is fashioned with a fender-simulating covex portion 78 terminating as an inwardly curved bead 79 which defines an upwardly arcuate recess the edge of which substantially conforms to the perimeter of one of the rear wheels. As appears in the inside view (Fig. 7) of the left one of the side aprons 77 the lower front corner of it is supplied with a spear-head shaped plunger 80 adapted yieldingly to interlock with a snap socket 81 on the rear extension of the beam section 56. The snap socket 81 is shown in Figs. 1 and 2 and this type of detachable yielding interlock is shown in detail in Figs. 10 and 11. If, however, the side aprons 77 are merely to be temporarily raised for brief examination of the engine they may be maintained in their raised position, as shown in Figs. 6 and 7, by employment of rods 82 having a hook at each end and with the lower hook engaging a flange on the lower margin of the apron while the upper hook engages the gutter 83 which extends around the lower margin of the top 47. As also appears to view in Fig. 7 the inside of the rear lower corner of each lateral apron 77 carries a spear-shaped plunger 84 which is adapted to cooperate in a like manner with a snap socket soon to be described.

Hinged to the tie bar 20 at 85, with a hinge design similar to that shown in Fig. 9, is a rear apron 86 fashioned with a spring socket 87 on the inside of each of its two lower corners as shown in Figs. 7, 10 and 11. Thereby, the rear apron 86 may be quickly interlocked with adjoining corners of both side aprons when in its depending position by causing the plungers 84 on the latter to enter the sockets 87. A suspension rod 88, shown in Figs. 6 and 7 may similarly serve to hold the rear apron in the elevated position in which it appears in that figure.

As shown in Figs. 1, 2, 4, and 7 this improved body is provided with a bumper comprising a spring band 89 forwardly supported by the bent brace 90. Clamped connections of the bumper through the rear apron are effected by means of a pair of bolt and nut combinations 91 shown in Figs. 12 and 13. The front side of the rear apron 86, as also shown in Fig. 6, is reinforced by a pair of channel bars 92 and to the forward face of each channel bar (when the apron hangs down) is fixedly secured a bracket 93 which extends obliquely from the apron as shown in Figs. 1, 2, and 7. The bolts 91 also clamp the channels 92 and bracket 93 to the opposite side of the rear apron as clearly shown in Fig. 12. To furnish added rigidity and security, a pair of short bolts 92a additionally clamp together the rear apron, the channel 92 and the bracket 93 above and below the bolts 91. Adjustably screwed into the end of each bracket 93 at 93a is a clevis 94 which is adapted to be detachably secured to the boss 26a and the bracket 29, respectively, when the rear apron is in its depending or covering position. As will be understood, the function of the brackets 93 is to transmit to the brackets 26 and 29 the thrust to which the bumper may be subjected.

As appears in Fig. 1 each folding door comprises two panels 95 and 96 of equal width and which are vertically hinged together by a hinge structure including a pin 97. As appears, for instance, in Figs. 18 and 23 a flat handle 98 is interiorly carried by the hinge pin between the door panels 95 and 96. The panel 95 also carries an outside handle 99. Fig. 24 illustrates the hinge connection 100 which is effected between the rear margin of the panel 96 and the upright 53. Above the handles 98 and 99 the panels 95 and 96 are provided with window panes 101 and 102 which are held in position by rubber framing channels 103 and 104 respectively. Such a framing is both easy of assembly and likewise shock and rattle proof. The forward uprights 52 each carries a soft rubber jamb 105 as clearly shown in Fig. 19, the rubber being suitably retained in a channel 105a welded to the upright 52. Projecting outwardly at the top of each folding door is an oblique guideway 106 as shown in Fig. 14 and in such guideway a roller 107 mounted when the panels 95 is adapted to travel when the folding door is collapsed outwardly preparatory to assuming its folded position as shown in Figs. 16 and 17, in which position the roller 107 will have reached the rear end of its track. As will be understood, the obliquity of the roller track 106 is required to permit the folded door to assume its alternative position against the side of the rearwardly adjacent portion of the body. Observation of Fig. 15 will disclose that when the folding door is in a position in which it closes the side entry at the cross passage, its hinge 97 will have passed slightly inwardly beyond dead center position limited by the abutment of the opposed corners of the door panels at the hinge 97. The yield of the resilient jamb 105 permits a pull exerted upon the handle 98 to effect such a slightly unparallel relation between the panels 95 and 96. This relationship makes possible the advantage that the folding door tends to remain in its closed position against inadvertent release with an opening movement. Ancillarily, this type of outwardly folding door presents the further merit that if the body of the operator unintentionally forces the door open or the operator falls against it, some portion of his body will become wedged between the panels 95 and 96 while in their V-forming position to automatically obstruct their further collapse.

As appears in Fig. 1 the outside of the panel 96 carries a spear head prong similar to those previously described, at a point below the handle 99 and near the hinge 97 as shown at 108 and such prong is adapted to enter a spring socket 109 carried by the side of the body above the lateral apron when the folded door assumes the position in which it is shown in Figs. 16, 17 and 22.

The entire body is of the maximum strength obtainable with the minimum of weight. It furnishes the maximum floor areas front and rear at elevations most convenient for frequent loading and unloading efforts, wide driver's vision both forwardly and sidewise, a wholly unobstructed cross passage with doorways of ample width for conveniently rapid luggage therethrough and a thoroughly insulated compartment for the protection of commodities deleteriously affected by excessive heat. Location of the power plant under the rear end affords added loading space in front while the displaceable aprons permit ready access from three sides alike during original assembly when jacks may be placed under the extensions 14 preparatory to rolling the tractor unit under the body from the rear or during future adjustments, renewals, or repair of any part of the tractor unit.

I claim:

1. A vehicle body comprising forward and rearward load carrying platforms disposed in a common plane, a passenger carrying floor intermediate said platforms and subjacent thereto, side panels affixed to the rearward platform, a front panel affixed to the forward platform, a top uniting said front and side panels, a frame tie bar constituting an engine support carried by said rearward platform, a trap door in the rearward platform for access to said engine support, removable hinged plates subtended from said side panels for access to said engine support and means to retain said plates in their closed position.

2. A vehicle body embodying a rearward load carrying platform, side panels affixed thereto, a forward load carrying platform, a passenger carrying floor intermediate said platforms and subjacent thereto, a shell enveloping the front and sides of said forward platform, the lower marginal edges thereof being substantially aligned with the plane of said floor, a top uniting said side panels and said shell, a transverse frame member constituting an engine hanger on said rearward platform, and demountable side panels subtended from the first named side panels for access to said hanger.

3. A vehicle body comprising a floor frame, side and end panels welded thereto, a top welded to said side and end panels, a member constituting an engine support on said frame, plates constituting axle supporting connections on said frame adjacent the rearward portion thereof and removable plates hinged upon said side panels for access to said engine support and axle supporting connections.

4. A metal vehicle body embodying as unitary sub assemblies, a frame, side panels, an end member and a top united in welded relation, said end member comprising a front panel and lateral panels, said lateral panels having notches in the lower edges thereof defining wheel clearance openings, said front panel having openings therein for the reception of headlights and a windshield, a load carrying platform superjacent the end portion of said frame encompassed by said end member and a channeled plate constituting a control member guard subjacent the central portion of said frame.

5. A vehicle body embodying a top, side wall panels welded thereto, a floor frame welded to said side wall panels and an end member welded to said floor frame and said top, said end member comprising as a unitary structure front and lateral panels enveloping the forward end of said floor frame, said lateral panels having openings therein adjacent the bottom thereof, fenders on said lateral panels adjacent said openings, removable aprons subjacent said side wall panels and fenders mounted on said aprons

ORPHEUS F. QUARTULLO.